Sept. 21, 1948.   H. B. KIRKLEY   2,449,556
DIFFERENTIAL LEAKAGE INDICATOR
Filed July 25, 1946
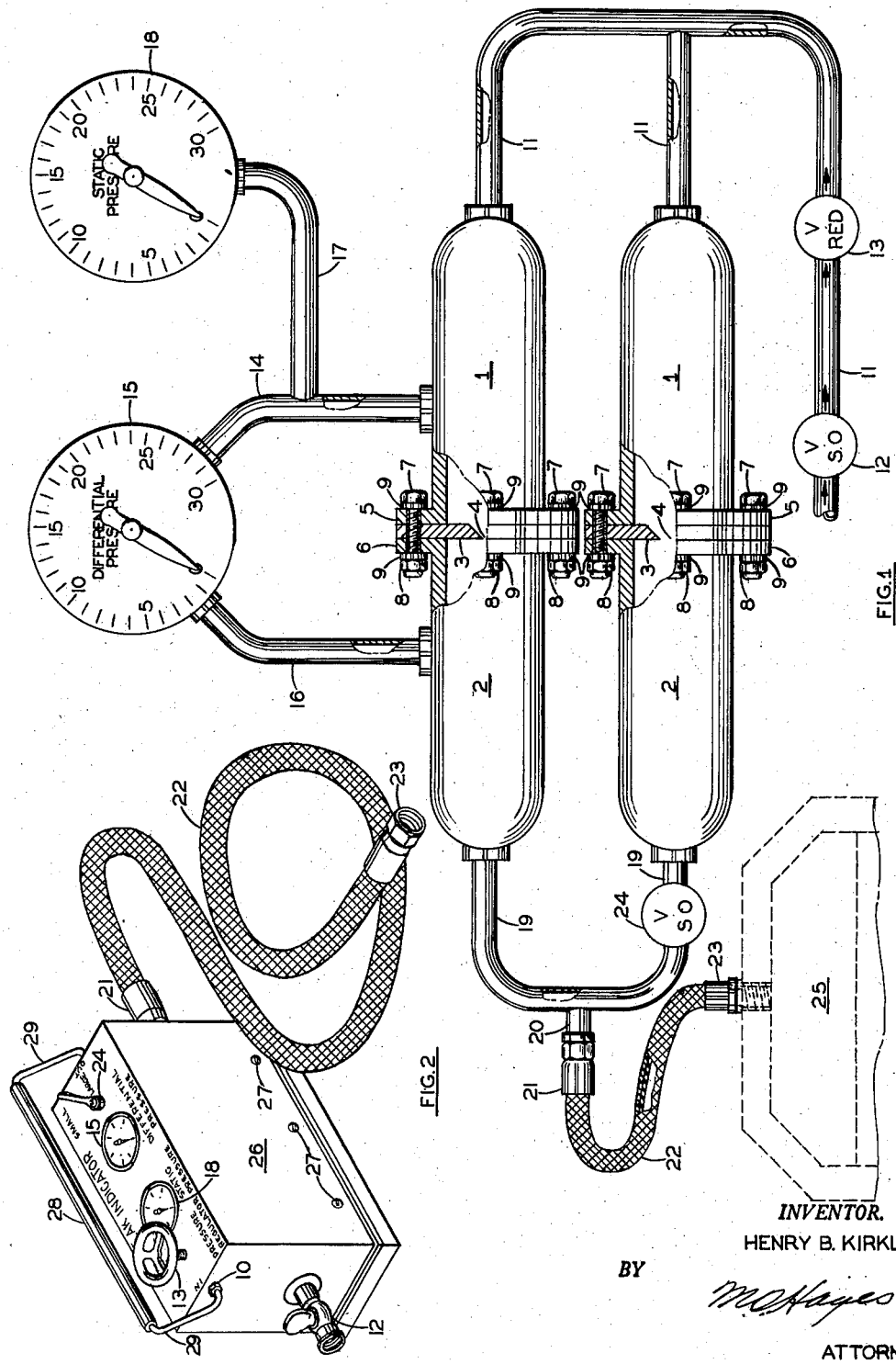
INVENTOR.
HENRY B. KIRKLEY
BY
*M O Hayes*
ATTORNEY Patented Sept. 21, 1948

2,449,556

UNITED STATES PATENT OFFICE 2,449,556

DIFFERENTIAL LEAKAGE INDICATOR

Henry B. Kirkley, Camden, N. J.

Application July 25, 1946, Serial No. 686,097

3 Claims. (Cl. 73—40)

(Granted under the act of March 3, 1883, as amended April 30, 1928; 370 O. G. 757)

This invention relates to new and useful improvements in differential indicators for indicating the size of the leak or the amount of leakage from any container under test.

A tank, piping system, automotive engine cylinder or closed container can be checked for leakage by means of an indicator of this invention which consists of two closed cylinders each divided into two chambers by a central orifice plate. One cylinder can be used alone or the two cylinders can be used together depending upon the size of the leak to be indicated. Compressed air, or other pressure fluid, is admitted to the first pair of chambers by a common supply line. The air then passes through the one or two orifice plates of the one or two cylinders to the second chamber or pair of chambers and then by a common flexible line to the container being tested for leakage. If the container being tested is an automotive engine the connection can be made at the spark plug hole. Three valves control the air flow and one gage indicates the static pressure in the first pair of chambers and another gage, connected across the orifice plates, shows the differential pressure between the two pairs of chambers. The differential pressure is related to the rate of leakage past the engine piston rings or valve seats so that the differential gage can be used to indicate the rate of leakage.

The pressure readings in pounds on the differential gage can be converted to size of leak or rate of leakage in cubic feet of air, or fluid, per minute flowing through the orifice and out through the cylinder or other container under test for leaks. No leakage is indicated by zero on the differential gage. A pressure-reducing valve is located in the air-supply line so that the pressure in the first pair of chambers can be held constant as indicated by the static-pressure gage connected therewith. The static-pressure gage and the pressure in the first pair of chambers are held to a constant reading during a test period by the pressure-reducing valve.

The smaller the leakage to be measured by this leakage indicator the smaller must be the orifice in the diaphragm or plate between the first and second chambers. Any convenient number of interchangeable diaphragm plates with their orifices of different sizes can be used in the leakage indicator to obtain accurate readings, and these are further controlled by stopcocks.

The principal object of this invention is to provide a leakage indicator that accurately indicates the size of a leak or indicates in pressure or volume the flow of air, or a fluid, through any restricted passages connected to the container to be tested for leaks.

Another object is to provide an air-flow measuring device using a differential-pressure gage to indicate the airflow through a selected size orifice between adjacent pressure chambers, one being held under a constant pressure, the other held under the reduced pressure resulting from the amount of leakage from the container under test.

Still another object is to produce a leakage indicator that is accurate, compact, rugged, portable, simple to build, to maintain and operate, and with which the amount of leakage, within selected limits, can be quickly and accurately determined.

These and other objects of the invention, and the various features and details of the construction, operation and use thereof, are hereinafter more fully set forth and described with reference to the accompanying drawing in which like numbers refer to like parts and in which:

Fig. 1 is a schematic drawing of interior mechanism of the leakage indicator; Fig. 2 is an isometric view of the exterior of the leakage indicator in a case.

In Fig. 1 numeral 1 designates the constant-high-pressure chambers of the air or fluid reservoir. Number 2 designates the low-pressure chambers of said reservoir. Between chambers 1 and 2 are diaphragms 3, each having an orifice 4 therein and providing a passage through which air or fluid flows from chamber 1 into chamber 2. Orifice 4 can be of various calibrated sizes according to the volume of leakage to be measured by the indicator. Diaphragm 3 is clamped between flanges 5 and 6 of chambers 1 and 2 respectively by bolts 7, nuts 8 and washers 9.

Air or fluid supply tube 11 has a shutoff valve 12 and also a pressure-reducing valve 13. Chamber 1 has a tube 14 connecting to one side of differential-pressure gage 15 and from the other side tube 16 leads from chamber 2 to differential-pressure gage 15. Tube 17 connects static-pressure gage 18 to chamber 1 through tube 14. Tube 19 connects chamber 2 through shutoff valve 24 and tube 20, with flexible tube 22 and coupling 21. Fitting 23 connects flexible tube 22 to container 25 which is to be tested for leakage. Shutoff valve 24, normally closed, can be regulated to increase or decrease the volume of air flow when necessary. It allows air or a fluid to flow through an additional orifice 4 which can be and usually is of larger area as required when large leakages are being measured.

In Fig. 2 numeral 26 refers to a case enclosing the parts as indicated schematically in Fig. 1. Screws 27 hold the case 26 in place and handle 28 supports case 26 through bale wire 29 which fastens to case 26 by nuts 10.

The present invention provides a novel device that is readily portable and usable where compressed air is available for instantly indicating the volume of leakage from any closed container to which this device is connected. It is also of relatively simple and inexpensive construction and entirely efficient and reliable in use.

Although a particular embodiment of this invention has been illustrated and described herein, it is intended that this invention not be limited to such disclosure, and changes and modifications can be made and incorporated within the scope of the claims.

The invention described herein may be manufactured and used by or for the Government of the United States of America for governmental purposes without the payment of any royalties thereon or therefor.

I claim:

1. Apparatus for indicating leaks in an object, said apparatus comprising a conduit adapted to be connected at one end to the object and at the other end to a source of fluid under pressure, an obstruction in said conduit for restricting flow of fluid through said conduit, said obstruction having therethrough an orifice of small size compared with the size of the conduit, a differential-pressure gage connected to the conduit on opposite sides of said obstruction, and a static-pressure gage connected to the conduit on the side of said obstruction remote from the object.

2. Apparatus for indicating leaks, said apparatus comprising a conduit adapted to be connected at one end to an object to be tested and at the other end to a source of fluid under pressure, an obstruction in said conduit for restricting flow of fluid through the conduit, said obstruction having therethrough a first orifice of small size compared with the size of the conduit and a second orifice of different size from the first orifice, means for selectively shutting off flow of fluid through the second orifice independently of flow of fluid through the first orifice, a differential-pressure gage connected to the conduit on opposite sides of said obstruction, and a static-pressure gage connected to the conduit on the side of said obstruction remote from the object.

3. Apparatus for indicating leaks, said apparatus comprising a first conduit, an outlet tube connecting one end of the first conduit with an object to be tested, an inlet tube connecting the other end of the conduit to a source of fluid pressure, a second conduit separate from the first conduit, the second conduit being connected at one end by a first connecting tube to the outlet tube and at the other end being connected by a second connecting tube to the inlet tube, a shut-off valve in one of the connecting tubes, a first obstruction in the first conduit for restricting flow of fluid through the first conduit, the first obstruction having therethrough a first orifice of small size compared with the size of the first conduit, a second obstruction in the second conduit for restricting flow of fluid through the second conduit, the second obstruction having therethrough a second orifice of small size compared with the size of the second conduit, the first orifice and second orifice being of different sizes, a differential-pressure gage connected to the first conduit on opposite sides of the first obstruction, and a static-pressure gage connected to the first conduit on the side of the first obstruction remote from the object.

HENRY B. KIRKLEY.

REFERENCES CITED

The following references are of record in the file of this patent:

UNITED STATES PATENTS

| Number | Name | Date |
| --- | --- | --- |
| 1,844,843 | Dezendorf | Feb. 9, 1932 |
| 2,332,567 | Gardner | Oct. 26, 1943 |
| 2,348,985 | Lewis | May 16, 1944 |